Oct. 23, 1951  W. E. HOFFMAN  2,572,341
TRAILER HITCH
Filed Aug. 24, 1948  2 SHEETS—SHEET 1

INVENTOR.
WILLIAM E. HOFFMAN
BY Edward M. Apple
ATTORNEY

Oct. 23, 1951     W. E. HOFFMAN     2,572,341
TRAILER HITCH
Filed Aug. 24, 1948                       2 SHEETS—SHEET 2
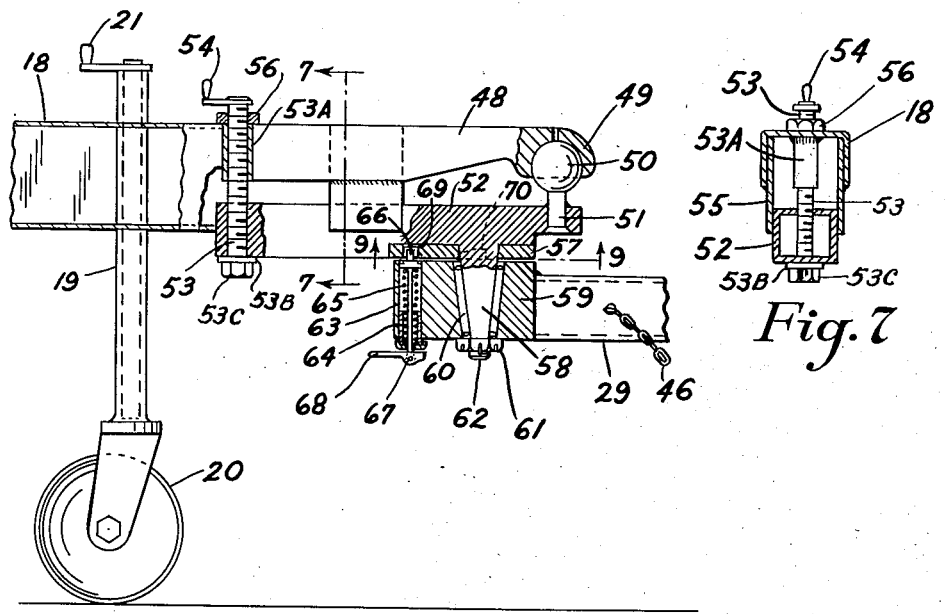
Fig. 6     Fig. 7
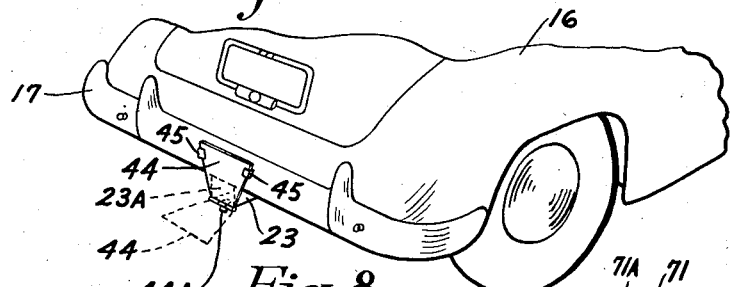
Fig. 8
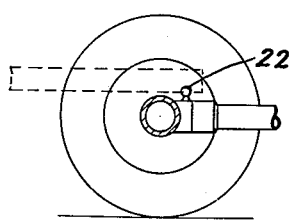 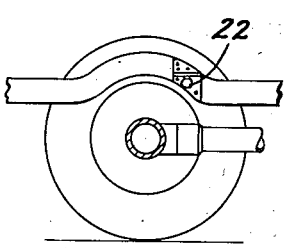 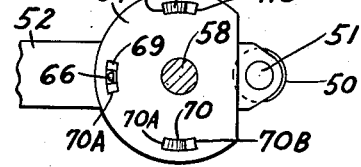
Fig. 10     Fig. 11     Fig. 9
INVENTOR.
WILLIAM E. HOFFMAN
BY *Edward M. Apple*
ATTORNEY

Patented Oct. 23, 1951

2,572,341

UNITED STATES PATENT OFFICE 2,572,341

TRAILER HITCH

William E. Hoffman, Los Angeles, Calif.

Application August 24, 1948, Serial No. 45,943

11 Claims. (Cl. 280—33.44)

This invention relates to trailer hitches, and has particular reference to a hitch for securing a conventional house trailer to an automobile.

An object of the invention is to generally improve trailer hitches, and to provide a device of that character which is economical to manufacture, easy to install, and efficient in operation.

Another object of the invention is to provide a trailer hitch which is simple in construction, and is arranged to permit the complete normal utilization of the tow car and permit the use of the top of the trailer tongue for storage purposes during the towing operation.

Another object of the invention is the provision of a novel trailer hitch which may be adapted for use with conventional type trailer tongues, or which may be incorporated as standard equipment with the trailer at the time of manufacture.

Another object of the invention is to provide a trailer hitch which may be practically concealed from view when the towing operation is completed, thereby presenting a neat appearance of both car and trailer when they are parked separately.

Another object of the invention is to provide a sturdy, safe trailer hitch, the parts of which may be automatically connected to one another for towing, and may be readily disconnected from each other without the necessity of the operator soiling his clothes or hands.

Another object of the invention is the provision of a device of the character indicated which is constructed and arranged so that the rear wheels of the tow car may be utilized as the front wheels and weight carrying elements of the trailer.

Another object of the invention is to provide a novel trailer hitch which is provided with a turning pivot in the nature of a "fifth wheel" on the trailer tongue, there being an automatic turn resister incorporated in said "fifth wheel" arranged so that it will lock the turning pivot in a straight ahead position until the turning resistance has been overcome and then permit easy turning through an approximate 90 degree angle either to the right or left of the straight ahead position.

Another object of the invention is to provide a trailer hitch having an automatic turn resister incorporated therein with means for adjusting the degree of turn resistance and means for releasing all action of the turn resister to allow free turning of the "fifth wheel" whereby the tongue of the hitch may be swung to a position under the trailer for storage.

Another object of the invention is the provision of a trailer hitch which is constructed and arranged to provide for normal turning along a highway, and for compensating for unevenness in road conditions, which turning is accomplished at or near the rear wheels of the tow car, with means for limiting the degree of such turning, and to transfer further turning of the "fifth wheel" positioned between the tow car and the trailer.

Another object of the invention is to provide a device of the character indicated, which is constructed and arranged so that the trailer tongue may be leveled to a predetermined height so that it may be automatically connected to the tow car by merely backing the tow car into attaching position.

Another object of the invention is the provision of a device of the character indicated, which is constructed and arranged so that the automatic attaching elements may be moved over a wide area horizontally to facilitate the attachment of the trailer to the tow car, although the trailer and tow car are not in direct alignment.

Another object of the invention is the provision of a trailer hitch which is constructed and arranged so as to reduce to a minimum the weight of the front of the trailer which has to be supported by the springs of the tow car.

Another object of the invention is to provide a trailer hitch which is arranged so that the effective wheel base of the trailer is lengthened, while at the same time a small part of the weight of the trailer is actually added to the front wheels of the tow car as well as the rear wheels thereof, which aids in the steering of the tow car inasmuch as there is no tendency for the front wheels of the tow car to be lifted from the road as happens in hitches where attachment is made to the tow car at the rear bumper, or any appreciable distance behind the rear wheels.

Another object of the invention is the provision of a trailer hitch which is constructed and arranged so that it is not necessary to provide overload springs on the tow car as is often times necessary when the weight of the trailer is carried on the bumper.

A further object of the invention is to provide a device of the character indicated, which will cause the trailer to tow in more of a straight line, and not be effected by the small turns of the front wheels for the reason that when towing from the bumper, which is from 36" to 48" behind the rear axle, the point of suspension actually moves in the opposite direction from the front wheels on turns, this causes the trailer to turn in the opposite direction and must again be pulled back into line as the car moves forward.

all of which results in the swaying of the trailer which is accentuated at higher speeds.

Although the device herein disclosed has the advantage of holding the trailer in a straighter line during gradual turns, it will cause an automatic transfer of the turning action from under the tow car to the "fifth wheel" intermediate the tow car and the trailer during sharper turns.

Another object of the invention is the provision of a trailer hitch, the use of which obviates the necessity of using dollys under the front end of the trailer while being towed.

In brief the invention resides in a trailer hitch consisting of a draw bar comprising a pair of adjustable, automatically interlocking telescoping members, one end of which draw bar is secured by means of a ball and socket joint to the chassis of a towing automobile, and the other end of which is secured to a conventional trailer tongue by means which permit the vertical adjustment of the draw bar with reference to the trailer tongue, and which provides a horizontally rotatable turning action between the trailer tongue and the draw bar with adjustable turn resisting elements cooperating between the parts, whereby various degrees of turn resistance may be effected.

The foregoing and other objects and advantages of the invention will become more apparent as the description proceeds, reference being made from time to time to the accompanying drawings, forming part of the within disclosure, in which drawings:

Fig. 6 is an enlarged fragmentary detail, with parts broken away and parts in section, showing the "fifth wheel" structure with built in turn resister.

Fig. 7 is a section taken substantially on the line 7—7 of Fig. 6.

Fig. 8 is a fragmentary perspective detail of the rear end of the tow car showing the position of the loading ramp when the trailer is not attached.

Fig. 9 is a section taken substantially on the line 9—9 of Fig. 6.

Fig. 10 is a fragmentary detail of the rear end of a tow car showing another location for the attachment to the tow car.

Fig. 11 is a view similar to Fig. 10, but showing a further modified position of attachment to the tow car.

Figure 1:
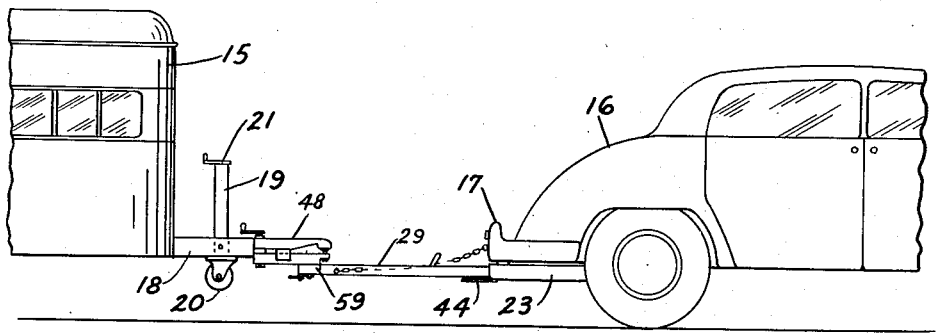
Fig. 1 is a fragmentary view in elevation showing the rear end of a tow car and the front end of a trailer connected with a device embodying the invention.

Referring now more particularly to the drawings, it will be understood that in the embodiment herein disclosed, the reference character 15 indicates a house trailer which is to be towed by an automobile 16, having a rear bumper 17. The trailer 15 has a conventional V-shaped tongue 18 on which is mounted a conventional parking jack 19, at the lower end of which is mounted a caster 20 which is adapted to be raised and lowered by means of a hand crank 21. The parking jack just described forms no part of the invention but is conventional equipment on many trailers.

The invention resides in the combination and arrangement of elements comprising the hitch proper, which I will now describe.

Figures 3, 4:
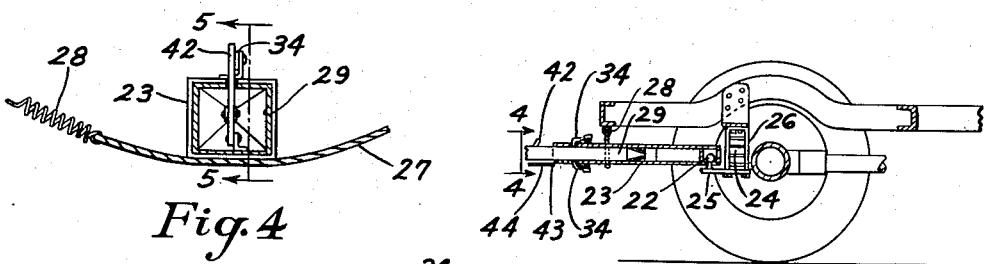
Fig. 3 is a section taken substantially on the line 3—3 of Fig. 2.
Fig. 4 is a section taken substantially on the line 4—4 of Fig. 3.

Secured to the tow car 16 by means of a ball and socket 22 (Figs. 2 and 3) is a tubular member 23 which is preferably square in cross section. I prefer to position the ball and socket 22 as near to the rear axle as possible. In Fig. 3 I show the ball and socket 22 as mounted on the transverse rear spring 24 by means of a plate 25 which is supported by a U-shaped member 26. Although I prefer for reasons indicated in the statement of objects and advantages hereinabove set forth to position the ball and socket ahead of the axle either on the drive shaft housing, as shown in Fig. 10, or at a point on the frame ahead of the axle as shown in Fig. 11.

The member 23 is free to move horizontally from side to side of the frame, and is supported beneath the frame by means of a cable 27, one end of which is attached to one side of the frame, and the other end of which is fastened to a spring 28 which is in turn fastened to the opposite side of the frame. This permits a limited amount of vertical movement of member 23 when attaching the device. Telescoping the free end of the member 23 is a tongue 29 which is also square in the cross section. The tongue 29 is tapered at one end, as at 30, to permit easy entry into the member 23. Stops 31 are positioned on the inside of the member 23 and engage the tapered portion 30 of the member 29 to limit its movement in one direction.

The members 23 and 29 are provided with alignable apertures 32 and 33 which are adapted to engage the locking detents 34 which are pivoted, as at 35, on brackets 36 welded to the outside of the member 23. The locking detents 34 are urged into locking position by means of springs 37. In order to release the locking detents 34 I provide a cam block 38 which is slidable on the inside of the member 29, and is adapted to move the locking detents outwardly as the ends thereof ride on the inclined faces of the cam block 38.

The ends of the locking detents 34 are tapered, as at 39, so that when the tapered portions 39 are positioned in the apertures 33 the member 29 can readily be withdrawn inasmuch as the tapered portions 39 will cause the ends of the locking detents 34 to move outwardly to clear the member 29.

Figure 5:
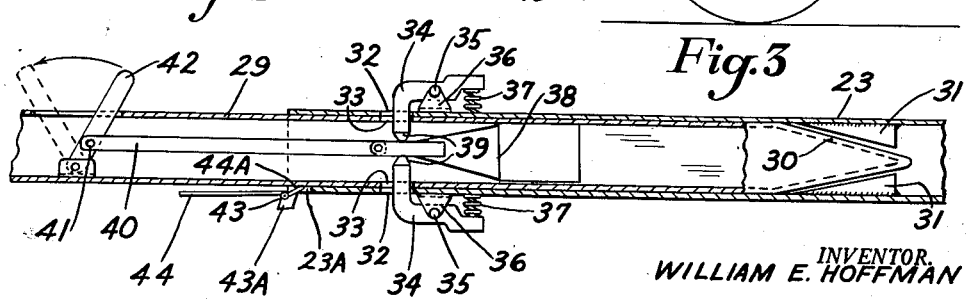
Fig. 5 is a section taken substantially on the line 5—5 of Fig. 4.

The cam block 38 is connected to an arm 40 which in turn is pivoted, as at 41, to a hand lever 42 which when moved into the position shown by the dotted lines in Fig. 5 causes the cam block 38 to move the locking detents outwardly to free the member 29.

Hinged, as at 43 (Fig. 3) to the underside of the member 23 (Figs. 3 and 5) is a loading ramp 44 which is arranged to facilitate the rapid insertion of the member 29 into the end of the member 23. This telescoping connection of the members 23 and 29 may be accomplished from any angle within a 200 degree arc, so that it is not necessary for the trailer 15 and the tow car 16 to be in alignment when the several parts of the hitch are connected. This is an important feature of the invention as it permits the trailer to be connected to the tow car merely by backing the tow car into proper position to permit the telescoping of the members 23 and 29. The hinge 43 has an abutment member 43A which holds the ramp 43 in loading position.

When the trailer 15 is not being towed, the loading ramp 44 is cradled in a pair of brackets 45 secured to the rear bumper of the tow car as shown in Fig. 8. When towing, the ramp is nested under the tongue 29 automatically as the tongue 29 contacts the ear 44A formed on the member 44. The ear 44A extends through an opening 23A formed in the bottom of the member 23.

Figure 2:
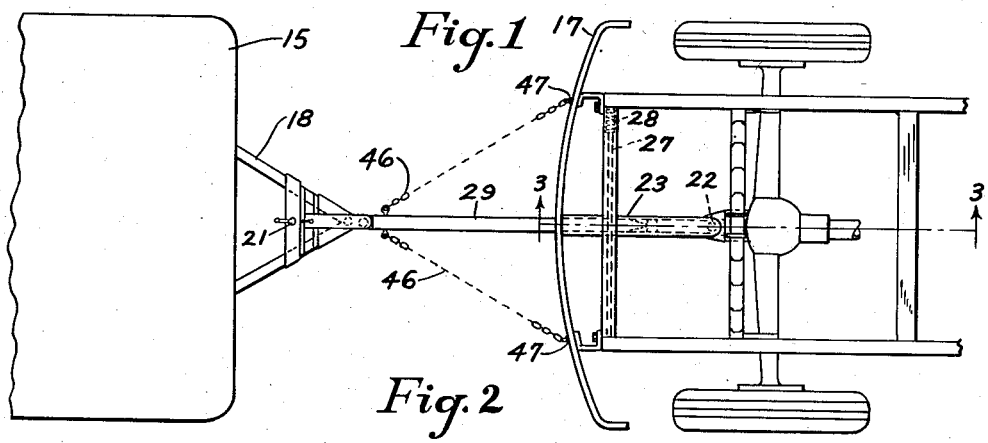
Fig. 2 is a top plan view of the elements illustrated in Fig. 1 with the body of the tow car removed.

In order to limit the horizontal movement of the tongue 29 I provide a pair of chains 46 which are secured at one end of the tongue 29 and at the other end of the bumper 17, as at 47 (Fig. 2). With this arrangement it will be understood, therefore, that the members 23 and 29 may pivot on the ball and socket joint 22 horizontally through a sufficient arc to accommodate the normal turns of the tow car and to avoid unevenness or obstructions in the road.

The action to accommodate unusual turns will then be transmitted to the "fifth wheel" structure, which I will now describe.

Referring to Fig. 6, it will be seen that the trailer tongue 18 has an extension member 48 which terminates in a socket 49, which is adapted to engage the ball 50 carried on a support 51 secured to the end of the draw bar 52, the latter being substantially square in cross section. The rear end of the draw bar 52 is secured to the trailer tongue 18 as follows: A threaded member 53 extends through a nut 56 welded to the top of the tongue 18, and also extends through a bushing 53A carried in a bore formed in the tongue 18. The threaded member 53 extends downwardly through a bore formed in the draw bar 52 and engages a washer 53B and a nut 53C positioned below the bar 52. The member 53 may be rotated in the nuts 56 and 53C by means of the crank 54, whereby the rear end of the draw bar 52 may be raised or lowered with respect to the tongue 18. Guide plates 55 prevent the horizontal movement of the member 52, but permit its vertical adjustment under the influence of the threaded member 53.

The draw bar 52 has formed integrally therewith a plate like member 57 and a depending spindle 58, the latter being arranged to engage a bearing block 59 carried at the end of the tongue 59. Suitable roller bearings 60 are positioned in the bearing block 59 and contact the spindle 58 to reduce friction and thrust stresses. The bearing block 59 is retained on the spindle 58 by means of a castellated nut 61, which engages a threaded extension 62 formed on the spindle 58.

A bearing block 59 is provided with a bore 63 into the lower end of which is threaded a bushing 64, which is adapted to serve as a retainer for one end of the spring 65. The other end of the spring 65 abuts a shoulder formed on the locking rod 66 which is slidable in the bore 63, and which is pivoted, as at 67, to a hand lever 68.

The locking rod 66 is adapted to engage slots 69, 70 and 71 formed in the plate 57. The slot 69 in the plate 57, Fig. 9, is deeper at the center and inclines upwardly toward either end so that the locking rod 66 rides in the center of the slot 69 when the tow car and trailer move in a straight line. When the turning action of the device is automatically transferred from the ball and socket joint 22 to the spindle 58 then there is sufficient turning effort to overcome the resistance of the spring 65. The bearing block 59 and tongue 29 will be permitted to move with respect to the plate 57. After the locking rod 66 has reached the flat surface of the plate 59 no substantial resistance is offered to the turning of the bearing member 59 until either one of the slots 70 or 71 is encountered by the locking rod 66.

It will be noted that the slots 70 and 71, Fig. 9, decline from the points 70A and 71A and terminate in abutment shoulders 70B and 71B, which prevent the further movement of the bearing block 59 except in the reverse direction.

Various degrees of spring tension may be applied to the locking rod 66 by threadedly adjusting the bushing 64 in the bore 63, and the rod 66 may be moved out of contacting relation with the plate 57 by means of the hand lever 68. When it is desired to park the trailer, the tongue member 29 may be swung 180 degrees to the rear and under the trailer by throwing the locking rod 66 out of engagement.

The device operates as follows: The member 23 is first secured to the chassis of the towing automobile, and when once installed remains in position. The members 29 and 52 and their associated elements are then mounted to the trailer tongue 18 and its extension 48 as previously described. The rear end of the member 52 is elevated or lowered, so that the front end of the member 29 is in proper alignment for telescoping the member 23. The towing vehicle is then backed up so that the member 29 telescopes the member 23 a sufficient distance to permit the locking elements 34 to become engaged, so that the telescoping members are securely locked in position. The leading ends of the chains 46 are then secured to the rear bumper of the towing automobile. The desired degree of turn resistance is then made by adjusting the tension on the spring 65 controlling the movement of the locking bar 66. The parking caster 20 is then elevated, and the device is ready for towing the trailer.

During the towing operation, the ordinary turns of the towing car and the unevenness or obstructions in the road are taken care of through the ball and socket joint 22, so that under these conditions the trailer will move in a substantially straight line. When a turn is made which develops sufficient force to overcome the resistance of the locking element 66 under tension of the spring 65, the turn will automatically be transmitted from the ball and socket joint 22 to the pivot 58. After the locking bar 66 leaves the slot 69–70A, the member 29 is free to rotate about the pivot 58 90 degrees in either direction, where turning in either direction will be limited by the stops 70 or 71. After the turn is completed, the parts will return to their "dead ahead" position where they will remain until another turn is encountered with sufficient force to overcome the tension of the spring 65.

When it is desired to disconnect the trailer from the towing vehicle, the locking members 34 are released by moving the release lever 42 to the position shown by dotted lines in Fig. 5. The chains 46 are then disconnected from the rear bumper of the towing vehicle, and the latter may be moved forwardly without disturbing the trailer. If the trailer is going to be parked for any length of time, the member 29 may be swung rearwardly on the pivot 58, so that it comes to rest under the trailer tongue.

Having described my invention, what I claim and desire to secure by Letters Patent is:

1. In a device of the character described including a trailer to be towed and a tow car, the combination of a tubular member secured at one end by a ball and socket joint to the tow car, a tongue in removably telescoping relation to said tubular member, a bearing member at one end of said tongue, said bearing member being adapted to rotate about a pivot, said pivot being supported by a draw bar one end of which is vertically adjustable with respect to the tongue of said trailer.

2. The combination defined in claim 1, including chains secured to said tongue and to the rear bumper of said tow car for restricting the horizontal movement of said tongue and said tubular member.

3. The combination defined in claim 1, including flexible means secured to said tongue and said tow car for restricting the horizontal movement of said tongue in said tubular member, and flexible means carried by said tow car for permitting the horizontal movement of said tubular member, and limiting the vertical movement of said tubular member.

4. The combination defined in claim 1, including quickly releasable locking means for retaining the said tubular member and said tongue in telescoping relation.

5. The combination defined in claim 1, including locking means for retaining the said tubular member and said tongue in telescoping relation, and means carried by said tongue for releasing said locking means.

6. The combination defined in claim 1, including a loading ramp hinged near the free end of said tubular member, and means carried by said tow car for supporting said loading ramp when said tongue is not in telescoping relation to said tubular member.

7. The combination defined in claim 1, there being adjustable turn resisting and locking means cooperating between said bearing member and said draw bar.

8. The combination defined in claim 1, there being turn resisting means cooperating between said bearing member and said tow bar, said turn resisting means including a plate like member carried by said tow bar, inclined slots in said plate like member, and a spring backed locking rod carried by said bearing member and adapted to engage said slots.

9. The combination defined in claim 1, there being turn resisting means cooperating between said bearing member and said tow bar, said turn resisting means including a plate like member carried by said tow bar, inclined slots in said plate like member, a spring backed locking rod carried by said bearing member and adapted to engage said slots, and means for holding said locking rod out of engagement with said plate like member.

10. In a device of the character described including a trailer having a tongue thereon, a draw bar adjustably secured to said tongue, a pivot on said draw bar, a second tongue having a bearing member adapted to rotate about said pivot, a tubular member secured for universal movement to said tow car and adapted to be telescoped by said second named tongue, means for restricting the universal movement of said tubular member, and means for limiting the horizontal movement of said second named tongue.

11. In a device of the character described including a trailer having a tongue thereon, a draw bar adjustably secured to said tongue, a pivot on said draw bar, a second tongue having a bearing member adapted to rotate about said pivot, a tubular member secured for universal movement to said tow car and adapted to be telescoped by said second named tongue, and resilient means interposed between said draw bar and said second named tongue for resisting the turning of said second named tongue with respect to said draw bar.

WILLIAM E. HOFFMAN.

REFERENCES CITED

The following references are of record in the file of this patent:

UNITED STATES PATENTS

| Number | Name | Date |
|---|---|---|
| 1,313,451 | Behlen | Aug. 19, 1919 |
| 1,943,594 | Flatley | Jan. 16, 1934 |
| 2,327,308 | Johnston | Aug. 17, 1943 |